(12) United States Patent
Blair

(10) Patent No.: US 8,285,833 B2
(45) Date of Patent: Oct. 9, 2012

(54) PACKET DATA RECORDING METHOD AND SYSTEM

(75) Inventor: Christopher Douglas Blair, South Chailey (GB)

(73) Assignee: Verint Americas, Inc., Roswell, GA (US)

( * ) Notice: Subject to any disclaimer, the term of this patent is extended or adjusted under 35 U.S.C. 154(b) by 1079 days.

(21) Appl. No.: 10/467,899

(22) PCT Filed: Feb. 11, 2002

(86) PCT No.: PCT/GB02/00586
§ 371 (c)(1),
(2), (4) Date: Jun. 10, 2005

(87) PCT Pub. No.: WO02/065704
PCT Pub. Date: Aug. 22, 2002

(65) Prior Publication Data
US 2005/0240656 A1  Oct. 27, 2005

(30) Foreign Application Priority Data
Feb. 12, 2001 (GB) .................................. 0103381.0

(51) Int. Cl.
*G06F 15/173* (2006.01)
*G06F 15/16* (2006.01)
*H04M 1/64* (2006.01)
*H04M 3/00* (2006.01)

(52) U.S. Cl. ............... 709/224; 379/85; 379/265.07; 379/67.1; 379/88.17; 379/266.1; 709/231; 709/230

(58) Field of Classification Search .......... 709/204–207, 709/224, 230–231; 379/88.17, 68, 93.07, 379/900, 85, 265.07, 266.1, 67.1
See application file for complete search history.

(56) References Cited

U.S. PATENT DOCUMENTS

| | | | |
|---|---|---|---|
| 3,594,919 A | 7/1971 | De Bell et al. | |
| 3,705,271 A | 12/1972 | De Bell et al. | |
| 4,510,351 A | 4/1985 | Costello et al. | |
| 4,625,081 A * | 11/1986 | Lotito et al. | 379/88.26 |
| 4,684,349 A | 8/1987 | Ferguson et al. | |
| 4,694,483 A | 9/1987 | Cheung | |

(Continued)

FOREIGN PATENT DOCUMENTS

EP 0453128 A2 10/1991

(Continued)

OTHER PUBLICATIONS

EPO International Search Report, May 22, 2002.

(Continued)

*Primary Examiner* — Gregory Todd
(74) *Attorney, Agent, or Firm* — McKeon, Meunier, Carlin & Curfman

(57) ABSTRACT

A data recording system that includes a plurality of network interface cards that may be employed within a single recording device. Each card may be provided with a plurality of network connecting ports to receive packetized data, such as real-time protocol (RTP) streams. For each RTP packet stream being recorded, the system may note the sequence number for the most recently accepted packet and any packet received with a lower sequence number can be readily discarded. The system then may record payload associated with the RTP streams into an audio file saved on a storage device.

15 Claims, 5 Drawing Sheets

U.S. PATENT DOCUMENTS

| | | |
|---|---|---|
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A | 9/2000 | Bar et al. ............... 709/224 |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Puram et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,547 B1 | 4/2002 | Eftink |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazar |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,614,781 B1 * | 9/2003 | Elliott et al. ................. 370/352 |
| 6,661,886 B1 * | 12/2003 | Huart et al. .............. 379/215.01 |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,735,634 B1 * | 5/2004 | Geagan et al. ............... 709/235 |
| 6,738,456 B2 | 5/2004 | Wrona et al. |
| 6,757,361 B2 | 6/2004 | Blair et al. |
| 6,772,396 B1 | 8/2004 | Cronin et al. |
| 6,775,377 B2 | 8/2004 | McIlwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,959,078 B1 | 10/2005 | Eilbacher et al. |
| 6,965,886 B2 | 11/2005 | Govrin et al. |
| 6,970,935 B1 * | 11/2005 | Maes ........................... 709/230 |
| 7,127,524 B1 * | 10/2006 | Renda et al. ................. 709/245 |
| 7,286,652 B1 * | 10/2007 | Azriel et al. ............... 379/88.22 |
| 7,330,875 B1 * | 2/2008 | Parasnis et al. ............... 709/204 |
| 7,383,574 B2 * | 6/2008 | Burrows et al. .................. 726/13 |
| 2001/0000962 A1 | 5/2001 | Rajan |
| 2001/0032335 A1 | 10/2001 | Jones |
| 2001/0043697 A1 | 11/2001 | Cox et al. |
| 2002/0016937 A1 * | 2/2002 | Houh ............................ 714/43 |
| 2002/0038363 A1 | 3/2002 | MacLean |
| 2002/0052948 A1 | 5/2002 | Baudu et al. |
| 2002/0065911 A1 | 5/2002 | Von Klopp et al. |
| 2002/0065912 A1 | 5/2002 | Catchpole et al. |
| 2002/0075880 A1 | 6/2002 | Dolinar et al. |
| 2002/0128925 A1 | 9/2002 | Angeles |
| 2002/0143925 A1 | 10/2002 | Pricer et al. |

| | | | |
|---|---|---|---|
| 2002/0165954 | A1 | 11/2002 | Eshghi et al. |
| 2003/0055883 | A1 | 3/2003 | Wiles et al. |
| 2003/0079020 | A1 | 4/2003 | Gourraud et al. |
| 2003/0144900 | A1 | 7/2003 | Whitmer |
| 2003/0154240 | A1* | 8/2003 | Nygren et al. ............ 709/203 |
| 2004/0100507 | A1* | 5/2004 | Hayner et al. ............ 345/855 |
| 2004/0165717 | A1 | 8/2004 | McIlwaine et al. |
| 2005/0138560 | A1 | 6/2005 | Lee et al. |

FOREIGN PATENT DOCUMENTS

| | | |
|---|---|---|
| EP | 0773687 A2 | 5/1997 |
| EP | 0989720 | 3/2000 |
| EP | 1054529 | 11/2000 |
| GB | 2369263 | 5/2002 |
| WO | WO 98/43380 | 11/1998 |
| WO | WO 00/16207 | 3/2000 |

OTHER PUBLICATIONS

"Customer Spotlight: Navistar International," Web page, unverified print date of Apr. 1, 2002.

"DKSystems Integrates QM Perception with OnTrack for Training," Web page, unverified print date of Apr. 1, 2002, unverified cover date of Jun. 15, 1999.

"OnTrack Online" Delivers New Web Functionality, Web page, unverified print date of Apr. 2, 2002, unverified cover date of Oct. 5, 1999.

"Price WaterouseCoopers Case Study" The Business Challenge, Web page, unverified cover date of 2000.

Abstract, net.working: "An Online Webliography," *Technical Training* pp. 4-5 (Nov.-Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).

Bauer, "Technology Tools: Just-in-Time Desktop Training is Quick, Easy, and Affordable," *Technical Training* pp. 8-11 (May/Jun. 1998).

Beck et al., "Applications of A 1 in Education," *AMC Crossroads* vol. 1: 1-13 (Fall 1996) Web page, unverified print date of Apr. 12, 2002.

Benson and Cheney, "Best Practices in Training Delivery," *Technical Training* pp. 14-17 (Oct. 1996).

Bental and Cawsey, "Personalized and Adaptive Systems for Medical Consumer Applications," Communications ACM 45(5): 62-63 (May 2002).

Blumenthal et al., "Reducing Development Costs with Intelligent Tutoring System Shells," pp. 1-5, Web page, unverified print date of Apr. 9, 2002, unverified cover date of Jun. 10, 1996.

Brusilosy et al., "Distributed intelligent tutoring on the Web," Proceedings of the 8$^{th}$ World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin, ISIS-Tutor: An Intelligent Learning Environment for CD/ISIS Users, pp. 1-15 Web page, unverified print date of May 2, 2002.

Brusilovsky, "Adaptive Educational Systems on the World-Wide-Web: A Review of Available Technologies," pp. 1-10, Web Page, unverified print date of Apr. 12, 2002.

Byrnes et al., "The Development of a Multiple-Choice and True-False Testing Environment on the Web," pp. 1-8, Web page, unverified print date of Apr. 12, 2002, unverified cover date of 1995.

Calvi and DeBra, "Improving the Usability of Hypertext Coursewae through Adaptive Linking," *ACM*, unknown page numbers (1997).

Coffey, "Are Performance Objectives Really Necessary?" *Technical Skills and Training* pp. 25-27 (Oct. 1995).

Cohen, "Knowledge Management's Killer App," pp. 1-11, Web page, unverified print date of Sep. 12, 2002, unverified cover date of 2001.

Cole-Gomolski, "New Ways to manage E-Classes," *Computerworld* 32(48):4344 (Nov. 30, 1998).

Cross: "Sun Microsystems—the SunTAN Story," Internet Time Group 8 (© 2001).

De Bra et al., "Adaptive Hypermedia: From Systems to Framework," *ACM* (2000).

De Bra, "Adaptive Educational Hypermedia on the Web," *Communications ACM* 45(5):60-61 (May 2002).

Dennis and Gruner, "Computer Managed Instruction at Arthur Andersen & Company: A Status Report,"*Educational Technical* pp. 7-16 (Mar. 1992).

Diessel et al., "Individualized Course Generation: A Marriage Between CAL and ICAL," *Computers Educational* 22(1/2) 57-65 (1994).

Dyreson, "An Experiment in Class Management Using the World Wide Web," pp. 1-12, Web page, unverified print date of Apr. 12, 2002.

E Learning Community, "Excellence in Practice Award: Electronic Learning Technologies,"*Personal Learning Network* pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.

*e-Learning the future of learning*, THINQ Limited, London, Version 1.0 (2000).

Eline, "A Trainer's Guide to Skill Building," *Technical Training* pp. 34-41 (Sep./Oct. 1998).

Eline, "Case Study: Briding the Gap in Canada's IT Skills," *Technical Skills and Training* pp. 23-25 (Jul. 1997).

Eline "Case Study: IBT's Place in the Sun," *Technical Training* pp. 12-17 (Aug./Sep. 1997).

Fritz, "CB templates for productivity: Authoring system templates for trainers," *Emedia Professional* 10(8):6678 (Aug. 1997).

Fritz, "ToolBook II: Asymetrix's updated authoring software tackles the Web," *Emedia Professional* 10(20): 102106 (Feb. 1997).

Gibson et al., "A Comparative Analysis of Web-Based Testing and Evaluation Systems," pp. 1-8, Web page, unverified print date of Apr. 11, 2002.

Halberg and DeFiore, "Curving Toward Performance: Following a Hierarchy of Steps Toward a Performance Orientation," *Technical Skills and Training* pp. 9-11 (Jan. 1997).

Harsha, "Online Training 'Sprints' Ahead," *Technical Training* pp. 27-29 (Jan./Feb. 1999).

Heideman, "Training Technicians for a High-Tech Future: These six steps can help develop technician training for high-tech work," pp. 11-14 (Feb./Mar. 1995).

Heideman, "Writing Performance Objectives Simple as A-B-C (and D)," *Technical Skills and Training* pp. 5-7 (May/Jun. 1996).

Hollman, "Train Without Pain: The Benefits of Computer-Based Training Tools," pp. 1-11, Web page, unverified print date of Mar. 20, 2002, unverified cover date of Jan. 1, 2000.

Klein, "Command Decision Training Support Technology," Web page, unverified print date of Apr. 12, 2002.

Koonce, "Where Technology and Training Meet," *Technical Training* pp. 10-15 (Nov./Dec. 1998).

Kursh, "Going the distance with Web-based training," *Training and Development* 52(3): 5053 (Mar. 1998).

Larson, "Enhancing Performance Through Customized Online Learning Support,"*Technical Skills and Training* pp. 25-27 (May/Jun. 1997).

Linton, et al. "OWL: A Recommender System for Organization-Wide Learning," *Educational Technical Society* 3(1): 62-76 (2000).

Lucadamo and Cheney, "Best Practices in Technical Training," *Technical Training* pp. 21-26 (Oct. 1997).

McNamara, "Monitoring Solutions: Quality Must be Seen and Heard," *Inbound/Outbound* pp. 66-67 (Dec. 1989).

Merrill, "The New Component Design Theory: Instruction design for courseware authoring," *Instructional Science* 16:19-34 (1987).

Minton-Eversole, "IBT Training Truths Behind the Hype," *Technical Skills and Training* pp. 15-19 (Jan. 1997).

Mizoguchi, "Intelligent Tutoring Systems: The Current State of the Art," Trans. IEICE E73(3):297.307 (Mar. 1990).

Mostow and Aist, "The Sounds of Silence: Towards Automated Evaluation of Student Learning a Reading Tutor that Listens" *American Association for Artificial Intelligence*, Web page, unknown date Aug. 1997.

Mullier et al., "A Web base Intelligent Tutoring System," pp. 1-6, Web page, unverified print date of May 2, 2002.

Nash, Database Marketing, 1993, pp. 158-165, 172-185, McGraw Hill, Inc. USA.

Nelson et al. "The Assessment of *End-User Training Needs,*" *Communications ACM* 38(7):27-39 (Jul. 1995).
O'Herron, "CenterForce Technologies CenterForce Analyzer," Web page unverified print dateof Mar. 2, 2002, unverified cover date of Jun. 1, 1999.
O'Roark, "Basic Skills Get a Boost," Technical Training pp. 10-13 (Jul./Aug. 1998).
Pamphlet, On Evaluating Educational Innovations[1], authored by Alan Lesgold, unverified cover date of Mar. 5, 1998.
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark™ Web Product," Web page, unverified print date of Apr. 1, 2002.
Phaup, "QM Perception™ Links with Integrity Training's WBT Manager™ to Provide Enhanced Assessments of Web Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: Univerty of California assist with Beta Testing, Server scripts now available on high-volume users," Web page, unverified print date of Apr. 1, 2002, unverified cover date of May 6, 1996.
Piskurich, Now-You-See-'Em, Now-You-Don't Learning Centers, *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom," *InfoWorld* 20(47):6467 (Nov. 23, 1998).
Unknown Author, "Long-distance learning," *InfoWorld* 20(36):7676 (1998).
Untitled, 10th Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).

Weinschenk, "Performance Specifications as Change Agents," *Technical Training* pp. 12-15 (Oct. 1997).
Witness Systems promotional brochure for eQuality entitled "Building Customer Loyalty Through BusinessDriven Recording of Multimedia Interactions in your Contact Center," (2000).
Aspect Call Center Product Specification, "Release 2.0", Aspect Telecommuications Corporation, May 23, 1998 798.
Metheus X Window Record and Playback, XRP Features and Benefits, 2 pages Sep. 1994 LPRs.
"Keeping an Eye on Your Agents," Call Center Magazine, pp. 32-34, Feb. 1993 LPRs & 798.
Anderson: Interactive TVs New Approach, The Standard, Oct. 1, 1999.
Ante, *Everything You Ever Wanted to Know About Cryptography Legislation . . . (But Were to Sensible to Ask)*, PC world Online, Dec. 14, 1999.
Berst, *It's Baa-aack. How Interative TV is Sneaking Into Your Living Room*, The AnchorDesk, May 10, 1999.
Berst, *Why Interactive TV Won't Turn You on (Yet)*, The AnchorDesk, Jul. 13, 1999.
Borland and Davis, *US West Plans Web Services on TV*, CNETNews.com, Nov. 22, 1999.
Brown, *Let PC Technology Be Your TV Guide*, PC Magazine, Jun. 7, 1999.
Brown, *Interactive TV: The Sequel*, NewMedia, Feb. 10, 1998.
Cline, Déjà vu—*Will Interactive TV Make It This Time Around?*, DevHead, Jul. 9, 1999.
Crouch, *TV Channels on the Web*, PC World, Sep. 15, 1999.
D'Amico, *Interactive TV Gets $99 set-top box*, IDG.net, Oct. 6, 1999.
Davis, *Satellite Systems Gear Up for Interactive TV Fight*, CNETNews.com, Sep. 30, 1999.
Diederich, *Web TV Data Gathering Raises Privacy Concerns*, ComputerWorld, Oct. 13, 1998.
*EchoStar, MediaX Mix Interactive Multimedia With Interactive Television*, PRNews Wire, Jan. 11, 1999.
Furger, *The Internet Meets the Couch Potato*, PCWorld, Oct. 1996.
*Hong Kong Comes First with Interactive TV*, SCI-TECH, Dec. 4, 1997.
Needle, *Will the Net Kill Network TV?* PC World Online, Mar. 10, 1999.
Kane, *AOL-Tivo: You've Got Interactive TV*, ZDNN, Aug. 17, 1999.
Kay, *E-Mail in Your Kitchen*, PC World Online, 093/28/96.
Kenny, *TV Meets Internet*, PC World Online, Mar. 28, 1996.
Linderholm, *Avatar Debuts Home Theater PC*, PC World Online, Dec. 1, 1999.
Rohde, *Gates Touts Interactive TV*, InfoWorld, Oct. 14, 1999.
Ross, *Broadcasters use TV Signals to Send Data*, PC World Oct. 1996.
Stewart, *Interactive Television at Home: Television Meets the Internet*, Aug. 1998.
Wilson, *U.S. West Revisits Interactive TV*, Interactive Week, Nov. 28, 1999.

* cited by examiner

PACKET DATA RECORDING METHOD AND SYSTEM

The present invention relates to a packet data recording method and related system.

The integration of computers into office communication systems has enabled many functions previously performed by separate devices to be combined into a single management system. For example, computer-based voice logging systems enable a computer to: receive voice communication through a hardware connection to the regular telephony network; to record either a conversation, in which at least two parties converse, or a message from at least one party to one or more parties; and to replay such recorded conversations or messages upon request.

It is therefore appreciated that commercial entities perform substantial amounts of business via telephone or Internet contact with their customers. The analysis of such contact can help businesses improve the quality and efficiency of their services, and assist with customer retention and, ultimately, profitability. Attempts have been made previously to achieve such analysis in a satisfactory manner and to a satisfactory degree. For example, many businesses have, for some time, recorded some of their staff/customer interactions. Traditionally this was done to satisfy regulatory requirements or to help resolve disputes. More recently, the emphasis has moved towards the reviewing of these interactions from a quality perspective. This is intended to identify good and bad aspects of particular interaction calls with a view to improving the level of customer service. Recently, for example, recording the activity on a PC screen has been undertaken to improve the completeness of the review procedure with the reviewer able to see how accurately staff are entering information received via the telephone.

Also, it has been known to employ Call Detail Recording (CDR) systems to prevent perceived abuse of telephone systems and to apportion costs to the department or individual making the calls.

Originally such records were printed out directly from the Private Automatic Branch Exchange (PABX) onto a line printer. Later, systems were designed to store this information in a database allowing more sophisticated reporting and searching for calls on the basis of one or more of the stored call details. More recently, Computer Telephony Integration (CTI) interfaces have been provided that give this information in real-time, during the call.

Further, several systems currently exist that use call recording in combination with CDR or CTI and a database application in order to perform routine monitoring of calls with the intention of identifying weaknesses in individual Customer Service Representatives (CSR). Typically a small percentage of the CSR calls are reviewed and "scored" against a set of predetermined criteria to give an indication of the quality of that particular member of staff.

Within a call-centre environment, it should also be noted that rather than simply using standard PC office automation applications when dealing with customers, staff in most call centres use increasingly sophisticated applications that help them to handle the calls more efficiently and effectively. Help desk applications and telemarketing call scripting applications are examples of such applications.

U.S. Pat. No. 6,122,665 discloses a method and a system for: the management of communication sessions for computer network-based telephone communication, and in particular for the identification of packets containing audio and/or video data; the storage of these packets; and for the reconstruction of selected communication sessions for audio and/or video display as needed. In particular, this document teaches the provision of a system and a method arranged to: record communication sessions performed over a computer network; to provide such a system and method for analysing data transmitted over the computer network in order to detect audio and video data transmitted over the computer network in order to detect audio and video data for recording; to provide such as system and method for displaying recorded video and audio data upon request; and to provide such a system and method for analysing, recording and displaying communication session conducted with a LAN-based telephone system.

As will be appreciated, U.S. Pat. No. 6,122,665 serves to illustrate a general move towards Voice over IP (VoIP) Communications as bringing together voice and data environments.

However, there remains a need to record interactions over data networks irrespective of whether these are voice communication sessions, video or data interaction between people and systems, systems and systems or people and people.

While it is noted that systems produced by, e.g. Hewlett Packard, have long been able to monitor data networks and store details and contents of the packets they observe, the primary function of such devices has normally been for network performance analysis and diagnostics. Disadvantageously they do not provide for the management of large volumes of recordings, and related archival and indexing.

Thus, such systems, and related methods, do exhibit limitations and disadvantages.

As a further illustration U.S. Pat. No. 6,122,665 merely serves to address the recording of a single network segment. However, with the prevalence of Ethernet switches and routers, it is rare for a system of any size to be implemented as a single network segment. Whenever multiple segments are introduced, the packets are routed between these segments as required in order to reach their destination. There is therefore no single point at which all packets can be observed. It would therefore prove advantageous to provide a system which can be extended to tap into the network at however many points are needed to achieve the required coverage. Unfortunately, merely extending a simple system designed for a single tap-point will result in highly redundant recordings as many of the packets to be recorded will arise at more than one tap point.

Further, known systems require knowledge of network addresses to operate properly. To determine what, and indeed how to record, some knowledge of the identity of specific IP addresses is often required. For example, knowing which IP address hosts an IP-PBX will allow better filtering of information and the analysis of call control packets involving that node. Unfortunately, many IP addresses are dynamically assigned, e.g. via DHCP. Also network configurations are regularly changed and updated as networks expand and evolve.

Neither do known systems address the use of proxy addresses. In many IP networks, packets are readdressed en route by Proxy Servers. This makes it difficult for the controlling software to identify which packets should be recorded as a single IP address is often only appropriate for packets transmitted over the leg of the journey from which they emanate, or which they finally reach having regard to the network node having that IP address.

The Known systems also do not support the recording of packet data streams along with voice/video. The system disclosed in U.S. Pat. No. 6,122,665 filters packets out that are not part of a voice or video stream. This prohibits its use in cases where the recording of a combination of data streams is required.

With regard to packet filtering, known systems are far from optimal. It is important that a recording system is able to process all the packets it receives and eliminate those that are not required as efficiently as possible. Often only a small proportion of received traffic is to be recorded. The described system performs its filtering initially by determining the type of traffic contained within the packet, for example voice or video versus other. In a large voice/video system with many concurrent sessions occurring, there will be many thousands of packets per second being received at the network tap point. In many cases only a small proportion of these will be required. Known systems will not filter out any of these at the first level and will pass all packets on to the following stage. Such manner of operation proves to be sub-optimal.

Disadvantageously, the integration of such a system with the systems controlling call placement is not generally achievable. Also, the determination of which IP ports to record on the basis of H323 signalling information also received via the network tap point is often superfluous. Rather, better information regarding the contacts and the requirement to record them can be obtained by interfacing to real-time event outputs, i.e. CTI ports, of the systems that are controlling the placement of calls. These ACDs or PABXs will often include additional information regarding the calls that cannot be deduced by observing the session control messages. For example, the linkage of one call to the next as calls are transferred between people is not always available from the session control protocol.

Also, tolerance issues such as the loss of critical packets is not addressed in known systems. However, in situations where session control information can be gleaned from analysis of session control packets, it can be disadvantageously adversely affected by the loss of a single packet. This can readily lead to a call not being recorded. In many systems, there can prove to be multiple ways to deduce such information, thereby making the system tolerant to the loss of certain packets.

As with filtering, known systems prove to be sub-optimal with regard to the storage of received packet data. The described system does not disclose in detail how the packets are stored and it appears that these are simply kept as raw, independent packets such that a significant potential for storage overhead has been found to arise.

Importantly, the known systems do not integrate well with traditional (non VoIP) storage and replay mechanisms. Again, the described system appears to store the recorded packets as packets and replays these by retransmitting them to a device similar to that which would have received them originally. In many systems, however, only part of the voice system is packet-based and certainly the replay mechanisms are often not packet based. Hence there is a need to store, retrieve and replay conversations in a way that is both efficient and compatible with existing circuit-switched voice systems.

Still further, such known systems do not address the specific requirements of testing and monitoring, nor do they attempt performance measure. In any packet system, there is the chance of the loss of a particular packet and the system described makes no reference to a determination of how well it is performing and whether any packets not recorded were lost by the network or at the recording device's network interface.

It is now appreciated that with simple extensions, such recording systems can be used to record data steams in a form suitable for use in simulated loading tests.

The capability for advanced recording options such as stereo and multi-party (conference call) recording are also disadvantageously absent from known systems. In particular, the system described does not address the added value that can be obtained by recording conversations so that they may be replayed in "stereo" with multiple tracks allowing the replayer to separate the audio travelling in each direction. Nor does it describe the extension of this technique into the recording of conference calls where the separation and identification of individual speakers is of great benefit in aiding the listener to follow the flow of conversation.

The present invention seeks to provide for a data recording system and method and exhibiting an advantage over such known systems.

According to one aspect of the present invention, there is provided a data recording system including data recording means having a plurality of network interface cards.

Of course, alternatively, where more than one segment must be tapped in order to receive all required packets, this can be done either by providing multiple systems, each tapping a single segment but this can result in the same recordings being made by multiple recorders.

A preferred embodiment is to use multiple network interface cards (NICs) within a single recorder.

Advantageously, each NIC may have multiple network connection ports, such as typically are used to provide fault tolerant connection to multiple Ethernet switches.

In this case, the filtering mechanism is enhanced to allow rapid elimination of duplicate packets. For each RTP packet stream being recorded, the system can advantageously note the sequence number of the most recently accepted packet. Any packet received with a lower sequence number (account being taken of sequence numbers wrapping as they overflow their assigned binary range) will immediately be discarded.

In this way, the system advantageously need not actively keep track of network topology and will operate regardless of how many copies of each packet it receives.

In larger or physically separated systems which require multiple recorders, it can prove impractical to bring all packets into a single recorder. In such cases, the individual recorders can be arranged to communicate with each other so as to advise each other of the presence of particular packet streams. In a prepared example, it is desired to record packets travelling between a specific pair of addresses:

a) each recorder is advised of the addresses to be monitored;
b) when a recorder identifies a packet with the required addresses it begins recording it and advises all other recorders to stand down; and
c) other recorders are arranged to note these addresses as being recorded elsewhere.

Further advantageous refinements to such a scheme can seek to ensure that only one recorder records each call or session in that:

d) the notification sent to other recorders call include within it the sequence number (or timestamp) of the RTP packet that was first received and the IP address (or other identifier) of the receiving recorder;
e) in the event that more than one recorder receives packets prior to hearing notification from another recorder that it has commenced recording, the recorder which received the earliest packet can maintain responsibility for recording and the other recorder shall cease recording;
f) should more than one recorder receive the same packet and send notification of this, then the recorder with highest IP address (or other algorithm allowing unique determination of priority) can maintain its recording and the other(s) will stand down;

g) when recording begins, a recorder will not create a record in the database of recordings until a pre-defined time has elapsed in case it receives, during this period, a notification from another recorder that it too has started recording. Should it receive such notification and, according to the algorithms defined in (d) to (f) above, it is to stand down, it will abandon its recording without having altered the database of recordings.

The following further refinements can be employed to ensure that packet loss is minimized:

h) should a packet be lost (as can be determined from a gap in the sequence number of received packets) an indication of the sequence number(s) of the lost packets can be maintained as part of the recording control structure for that IP address; and i) when packets are received that are determined to be earlier than the most recently accepted packet for that address, their sequence number can subsequently be compared against the list of recently missed packets and, if found, can be stored at the appropriate offset within the recording buffer overwriting the padding that was inserted when the later packet was received and loss of packet(s) identified.

It should be appreciated that the invention also provides for a data recording method employing a plurality of network interface cards and as described above.

According to another aspect of the present invention, there is provided a data packet recording system arranged for determining an IP address of an application and including means for comparing at least a sample of received or transmitted packets with at least a set of pre-programmed signature packets.

The system can then advantageously determine the IP addresses of significant applications by comparing all packets received from or sent to each destination against a set of pre-programmed signature packets. These packets are preferably chosen to be examples of the traffic expected to involve the node being sought. For example, in many IP-PBX systems, each IP-phone regularly heartbeats by sending a simple packet to the IP-PBX control application every minute or so. By monitoring for these packets it is possible to determine the location of the IP-PBXes in the system being monitored.

Preferably, the sustained absence of such packets can also be used as an indicator of an error condition with the device that was previously active on that address and can trigger an alarm condition and/or fallback mode of operation.

It should be appreciated that the invention also provides for a data packet recording method including a comparison step as described above.

According to yet another aspect of the present invention, a data recording system is provided wherein data packets are arranged to be transmitted via a Proxy server and further arranged such that the IP address of at least one party to the conversation is altered. This advantageously allows for security and re-use of address space although difficulties can be experienced in determining which packets should be recorded.

The invention can preferably address this by being arranged to:

a) determine the presence and IP address of such Proxy servers either by explicit configuration information or, preferably, by analysing the pattern of packets entering and leaving the IP node. This can be achieved for example by comparing the contents of packets transmitted by each node with the contents of those received by that node. Should it find packets that are identical bar the IP address, it can both deduce that this node is performing a Proxy function and determine the current mapping of IP addresses that it is performing;

b) allow for recorders passing their knowledge of current mappings to other recorders allowing them to refine their filtering algorithms; and c) pass examples of specific packets identified as having been mapped by the Proxy server to other recorders. This advantageously allows recorders to differentiate between overlapping address ranges. For example, two different Proxy servers may both be mapping addresses in a given range. By passing occasional packets to each other, along with their pre-mapping addresses, recorders can determine whether the stream of data they are observing is indeed that for this address or a completely different stream mapped by a different Proxy server.

As before, the invention also provides for a corresponding method including IP address alteration.

According to still another aspect of the present invention, there is provided a data packet recording system including packet filtering means arranged to perform on the basis of an IP address and preferably, an IP port number of both source and/or destination address(es). Having determined that the packet is one that is to be recorded, the system can preferably then store the packet in the most appropriate way.

For example, for RTP streaming data:

a) The system is arranged to analyse the sequence number and timestamp to determine whether this is the next packet in the expected sequence;

b) if one or more packets have been missed then performance counters can be incremented appropriately;

c) additional data can preferably be inserted in the recorded stream to pad out the space that should have been taken up by the missing packet(s). This advantageously avoids gradual drift between the recording and real-time which would otherwise build up and result in the call being shorter when replayed than it had been originally; and d) the payload of the RTP packet can be appended to a buffer and the remainder of the packet discarded; and e) optionally, information can be flagged from the packet header so as to be retained where this is not the default header, i.e. it cannot be fully deduced from knowledge of the previous header.

As an example for other packet oriented data:

a) Optionally, a signature data pattern (e.g. well known particular 4 byte value) can be appended to the data buffer collecting packets to/from the specific destination. This advantageously ensures that any application reading the recording subsequently can re-synch with these inter-packet boundaries should the recording become corrupted or the start of the recording cannot be accessed;

b) a timestamp indicating the time at which the packet was received is appended to said buffer. This will typically be precise to at least millisecond and can often achieve micro-nanosecond precision;

c) a length indicator specifying the number of bytes in the recorded packet is appended to said buffer; and d) finally, the contents of the packet can be appended to said buffer Again, the invention also provides for a related method.

In an alternative data filtering arrangement and method filtering according solely to address data, or at least before looking at packet content type can be provided. In some cases a given IP port might only be transmitting one type of data and so filtering on its address alone can advantageously prove sufficient in whether or not to record the packet.

A preferred arrangement can involve looking up the address of the IP destination of each packet, or equally source data, as the primary filter. A "map" of known addresses is maintained and each entry serves to identify whether data going to (or from) that address should be recorded. Advantageously, by utilizing the IP address as the primary key into this map, extremely fast look-up can be achieved.

Further preferred refinements to this scheme include:

a) the pre-filtering of packets on IP address so as to eliminate packets sent to or from the recorder itself. This allows the same network interface card to be used for normal IP communications (e.g. with clients searching and replaying previously recorded calls) whilst it is also being used a promiscuous mode tap. This simple filtering out on a single (32-bit) integer IP address avoids the need to look up the address map repeatedly for all packets that are directed at other sockets on this node. With the introduction of IP Version 6, this will become a 128-bit integer comparison;

b) in preference to hashing or sorted table indexing, the map of required addresses can be implemented as a memory array. By using the fact that most IP addresses required will lie within a narrow range of possible values it is faster to compare the high order bytes of the IP address with the sub net or nets on which all the target nodes are located. The remainder of the address can then be used as an index into a (typically sparsely populated) memory map in which each address to be recorded is represented by a binary 1 and the remainder as 0. For a Class B address as described here, only 64K bits of information are required to achieve this though the use of 65,536×32 bit words allows for each entry in the map to be either null (0x00000000) or a pointer to the structure describing the known address and its recording details e.g. buffer storage location. It should be noted that a similar scheme can be used in IP Version 6 albeit with a much smaller portion of the overall numbering range being covered by such a table;

c) in RTP based systems, many of the data streams being transmitted are constant bit rate. In these cases, many sessions will be transmitting packets at a regular rate resulting in a strong correlation between the order in which packets are received. This is especially true in cases where all transmitters are of the same type e.g. an IP-PBX with many identical IP-phones, all configured with the same packet interval. This can be used to advantage in filtering the incoming packets. If a record is maintained of the recently received packet addresses, the following optimized search algorithm can be deployed I. note the IP destination address of the first RTP packet received at the head of a list of such addresses. Look up the known destination for this address and include a pointer to it at the head of a list of such pointers, II. as subsequent packets are received, compare their address against the packet at the head of the list, III. if they are different, append their addresses to the list; look up their known destination descriptor and append it to the list of such pointers, IV. if it matches the address at the head of the list, use the pointer to the known destination at the head of such list. Note that the next packet should be compared to the following entry in the list, V. subsequent packets should be compared to the next entry in the list. If they match, repeat step IV, if not, insert them into the list at this point.

d) The algorithm of c above can preferably be further refined to accommodate the cessation of transmission from any address as happens when a call terminates. By comparing the new packets address against the following item in the list, we can determine that the previous address has probably ceased transmitting and it can be removed from the list.

e) To allow for the case where two streams cease in one cycle of the list, it is necessary to look two addresses ahead if the new packet s address is not found at the head or subsequent entries in the list. This is a common case as both directions of the call will typically terminate at or about the same time. However, given a typical interval between transmission of 50 ms it is rare that more than one call terminates in any given cycle of the list.

As will be appreciated, traditional telephone recording systems are often controlled by or determine call details by interacting with the telephony switch via a Computer Telephony Integration (CTI) interface. Such an interface typically advises the recording system of call setup and teardown as well as associated details such as dialled digits, calling line identifier (CLI) etc. As such systems move to packet transmission of voice, many are doing so incrementally and hence supporting a mix of packet and traditional calls.

Where such an interface exists, it is beneficial to retain the existing investment in its design and also to allow support of VoIP and traditional calls with a single interface rather than having to support a further interface.

The present system and related method advantageously supports the use of existing interfaces, provided that where such interface previously provided call identification in the form of telecoms circuit and timeslot information allowing the matching of recorded data stream with call details, it is enhanced to provide equivalent information in the form of IP address and, preferably IP port number. Ideally the addresses of both parties to the conversation (be they IP phone and/or gateway) are provided.

However, in some cases, the telephony system is only aware of the IP address of one or other party involved in the call. It is a preferred feature of the present invention that the instruction to record a specified address (source or destination) can optionally be extended with the instruction to automatically start recording of the counterpart with which that address starts to exchange data. In the case of an IP destination being recorded, this is achieved by noting the source of the packet that is recorded and creating a corresponding known destination record for that address. In this way, subsequent packets sent to the newly identified address will also be recorded. Obviously the converse applies should packet source be specified originally.

Further, where call control packets are analysed to determine which addresses are to be recorded, there is a danger that the failure to receive such a packet could result in the subsequent failure to record the entire conversation e.g. if the packet lost contained the extension number of the IP phone and hence it was not recognized that a call to a recorded extension had started.

Fortunately, many such protocols are redundant and the required information can be deduced from several of the packets.

According to a further aspect of the present invention, the system can specifically address the case where IP telephones are controlled by an IP-PBX application. In such cases it is typically possible to deduce the IP port address to be used for transmission in multiple ways. In one case (Cisco CallManager) the controlling application requests that each phone advise it of the port number it can receive incoming audio data. It then advises the other phone in the call of that number. Hence the recorder can determine the port number to record should it receive either of these interactions. Should it receive both, the redundant information can easily be recognized as such and ignored.

Yet further, when recording RTP streams, the header of these packets can be almost entirely derived from that of the previous packet and hence contains little of value. By advantageously arranging for the identification and storage of only the payloads of successive RTP messages, the storage requirements for recording a session are dramatically reduced. This is particularly so in the case of compressed audio transmission where the audio payload may be as little as twenty bytes in a packet of over one hundred bytes in total.

An embodiment of the present invention also addresses the issue of packet loss by being arranged to compare the sequence number of the received packet with that of the previously received packet. Should these differ by more than one, packet loss can be deduced. In addition to noting the loss in system performance counters, the missing packets can be "padded" out in the buffer being used to receive the recording.

Aspects of the present invention can also address the use of silence suppression which results in breaks in the transmission stream. In such cases, the timestamps of successive packets indicate the extent of the suppressed silence whilst the successive sequence numbers let us differentiate between deliberate silence suppression and the accidental loss of packets as described above.

When packets are suppressed in this way, the present invention provides for either:
  the insertion of the appropriate amount of "padding" data which may be pure silence or "noise" derived according to a compression scheme; or
  the insertion of explicit indication of the silent period into the recorded stream. Such as scheme is described by Microsoft in the definition of the ".WAV" file format.

This provides more efficient storage of such silence periods but unfortunately, most ".WAV" file players do not support this mechanism.

The present invention can advantageously further optimize storage by supporting a range of compression formats and acting on the received data according to user defined rules. These can include:
  compressing data received in a specified format (e.g. G.711 mu-law) to a specified second format (e.g. G.726 16 kbps);
  leaving data received in a compressed format in that format (to avoid the inherent quality reduction associated with decompression and further compression;
  optionally mixing the two halves of a communication session into a single, mono, recording (preferably) prior to compression; or
  optionally saving to non-volatile storage (e.g. disk) a summary representation of the audio levels on each of the two channels prior to compression and/or mixing. This Energy Envelope representation allows a compact (20 samples per second, 2 byte values) representation that permits the graphical display of the call showing which party was speaking at what level even though the two halves of the call are subsequently mixed and only available as a mono rather than stereo signal.

Within aspects of the present invention, by storing the packet payload in a standard .WAV file, the recorded audio can be replayed alongside traditional recordings using any existing replay mechanism.

Also, given the ability of the system to record packet data with timestamps for each packet received, the system may be run in a special mode in which all packets recorded are processed and stored as described in above for the aforesaid other packet oriented data. By storing all packets, including RTP streams, in this way, the recordings made can subsequently be used advantageously as known test cases for exercising and testing the invention.

By replaying recordings made in this way over the network, recorders under test will receive exactly the same packet stream as the recorder that made the original recording did. Hence known test cases can be run automatically and the output of the recorders compared with that of previous test runs.

It is a further feature of the present invention that said recording files can be arranged to be processed offline, so as to multiply the traffic and hence simulate larger systems than were actually recorded. By replicating the packets in the recording file and, for example, incrementing the IP port numbers for each replication, large volumes of traffic can be simulated from a single recording.

In another aspect of the invention, it is important that such recorders do not lose data packets as this will reflect in loss of audio and/or loss of control information and hence possibly missed calls. The present invention therefore can be arranged to monitor its performance in the following way:
1. the gaps in the received packet stream can be determined as described above;
2. by analysing the RTCP packets received alongside the RTP packet streams it is possible to see the loss statistics being experienced by the actual participants in the call;
3. by comparing the above two figures an estimate of the packet losses occurring somewhere other than en route between the end points can be determined. Some of this will be due to the recorder and can be used as an indication of the quality of the recording;

In yet another aspect and as discussed above, recordings may advantageously be stored independently for each direction of transmission or combined into a single, mixed recording. The former is highly advantageous should analysis of who was talking be required e.g. to identify angry callers from high interruption levels or in performing speech recognition on the files. The latter however is both less accurate and less useful when performed on a mixed recording since a single speaker model cannot be used and it is not clear who said each word.

On conference calls it is particularly beneficial to retain a recording of each party involved in the call since with many speakers, it can be difficult to differentiate between speakers with similar voices, and there is often background noise from one or more parties that makes it difficult to hear the principal speaker It is a preferred feature of the present invention that the recordings of a multiparty interaction can be kept as independent streams or mixed together to optimize storage space. As mentioned above, it is possible to retain a summary record of the level of audio from each speaker even though the actual audio signal has been mixed.

It is a further preferred feature of the present invention that when such conferences are handled by a conference bridge, which mixes the signals, storage of the conversations can be limited to the minimum set of data streams needed to reconstruct the conference audio. This advantageous aspect is achieved as follows for a conference between parties A, B and C using conference bridge X
  A, B and C each transmit audio to X
  X transmits audio from (B+C) to A
  X transmits audio from (A+C) to B
  X transmits audio from (A+B) to C The recorder may simply be instructed not to record packet streams coming from the conference bridge X and hence only records the pure audio from each of the contributing parties. The required mixed signals can be reconstructed at replay time if required from these three streams.

Of course, it should be appreciated that the invention can comprise any one or more of the aspects and embodiments described above in combination or alone.

The invention is described further hereinafter, by way of example only, with reference to the accompanying drawings in which.

Figure 1:
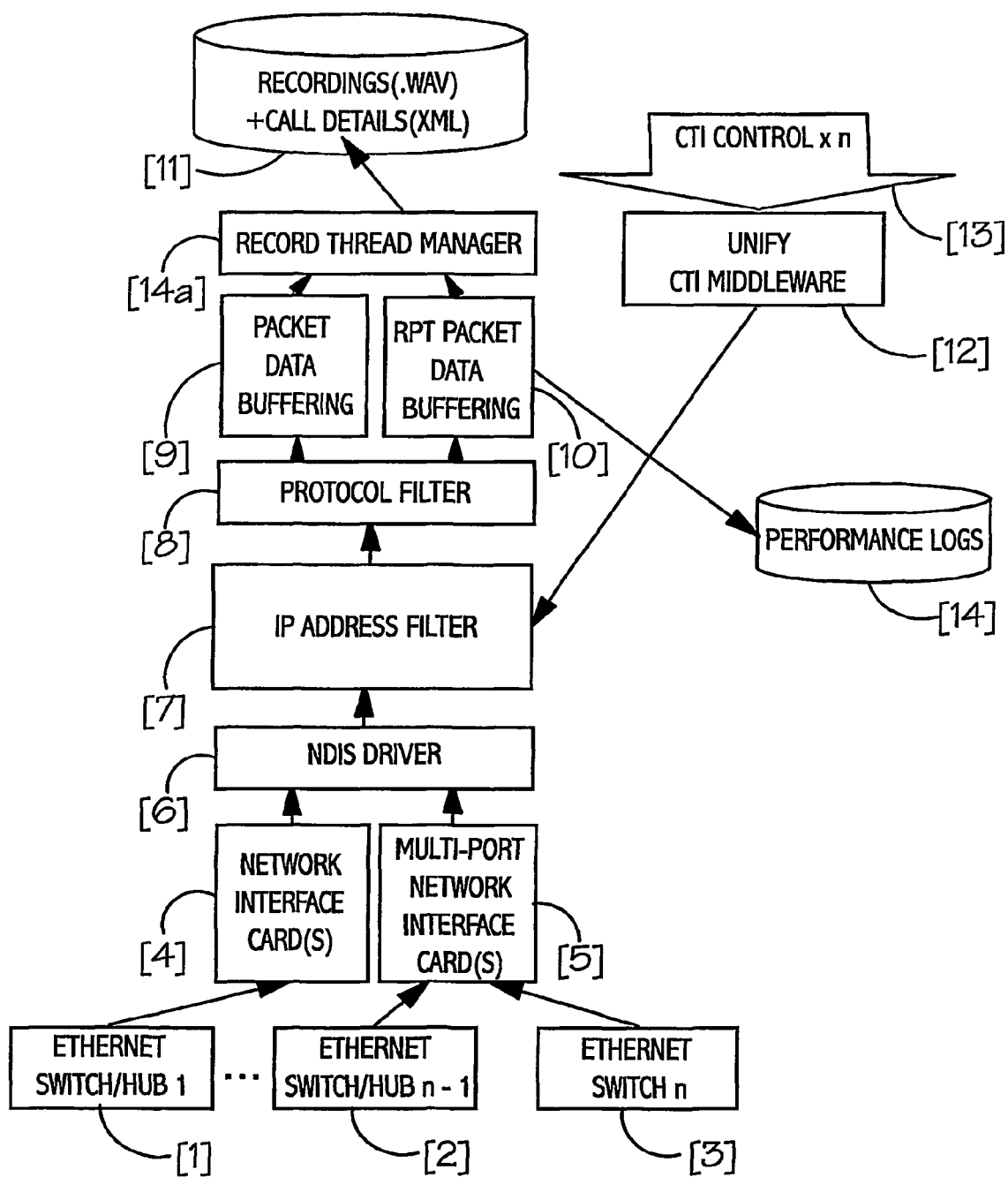
FIG. 1 is a block diagram of a recording sub-system embodying the present invention.

Turning now to FIG. 1, there is illustrated a recording sub-system embodying the present invention and in which a recorder is connected to a network from which calls are to be recorded by connecting into allocated ports on one or network routers, switches or hubs such as the 10/100 Mbps Ethernet hubs [1], [2], [3]. In the case of intelligent switches, which only transmit data packets to those ports that need to receive the data, a "SPAN" setting is normally applied to the port used for the recorder. This setting is normally used for network diagnostics and forces the switch to copy packets destined for one or more of its other ports to this port as well.

Each router/switch/hub is connected to an appropriate form of network interface card (NIC), for example 10/100 Mbps Ethernet, Token Ring, Gigabit Ethernet [4], [5]. The NIC [5] is an example of a multiport NIC which allows connection to more than one network access point. This allows efficient recording of larger networks where calls are spread across several network concentrator devices, without the need for a separate recorder for each of these.

Within the operating system on the Recorder, such as Windows 2000 there will be installed one or more drivers that allow applications to communicate with the NIC(s) installed. A common NDIS driver (6) is illustrated. This typically allows other applications running on the same computer to share access to the NICs without having to be aware of each other. Hence this diagram only shows the recording sub-system. Note the archival, search and retrieval functions typical of a bulk voice recorder can still be hosted on the same PC providing of course that there are sufficient memory, processor and disk resources for these to co-exist.

The system described communicates with the NDIS driver [6] and establishes a data channel which it places in promiscuous mode. This overrides the normal behaviour in which only data packets destined for this application will be delivered and instead requests that all data packets received via the network access point are passed through to an IP Address Filter mechanism [7].

The IP Address Filter mechanism [7] is described in more detail below with reference to FIG. 2. In summary, it compares the IP address and port number of each received IP packet against a list of known destinations. This could be equally well be applied to known sources rather than destinations. A rapid decision is made as to whether this packet is to be recorded or not. If the answer is yes, it will pass the packet on to a Protocol Filter [8].

This second stage filter [8] can therefore now use both knowledge of the destination to which the packet was sent and information from the IP packet itself to determine whether the packet contains RTP or RTCP data or other packet data. The filter [8] passes the packet on to either a Packet Data Buffering module [9] or a RTP Packet Buffering module [10].

Each of these two buffering modules [9], [10] applies schemes appropriate to the data type being recorded before passing on data, in relatively large, contiguous blocks, to the Record Thread Manager [14a] which, running at slightly lower priority than the previous components will write this data to the appropriate files on the hard disk. This results in efficient large data writes to the permanent storage such as a hard disk [11]. The end result is typically a pair of files one containing the actual content of the data stream, for example a .WAV audio file for RTP transmitted telephony, and the other containing details of the recording such as a .XML file containing start time, duration, IP address etc. Alternatively the details of the recordings may be inserted directly into a database.

In buffering the RTP data streams, the RTP Packet Buffering module analyses the sequence numbers and timestamps of the received packets. It compares the packet loss rates it is experiencing against those reported by the participants in the streaming interaction and can hence deduce performance levels which it logs for example to a file [14]. It could equally well pass this information into a network management tool such as via Simple Network Management Protocol (SNMP).

The set of known destinations that are to be recorded can be fixed in a variety of ways. For example, it could be achieved by direct, local configuration of the IP Address Filter [7], through blanket rules such as recording all streams; or it can be instructed explicitly by a component such as Unify [12] a CTI middleware platform which interfaces with a wide range of telephony and other customer contact service systems [13]. By observing activity on the external system and applying business rules, the addresses to be recorded can be readily identified.

Figure 2:
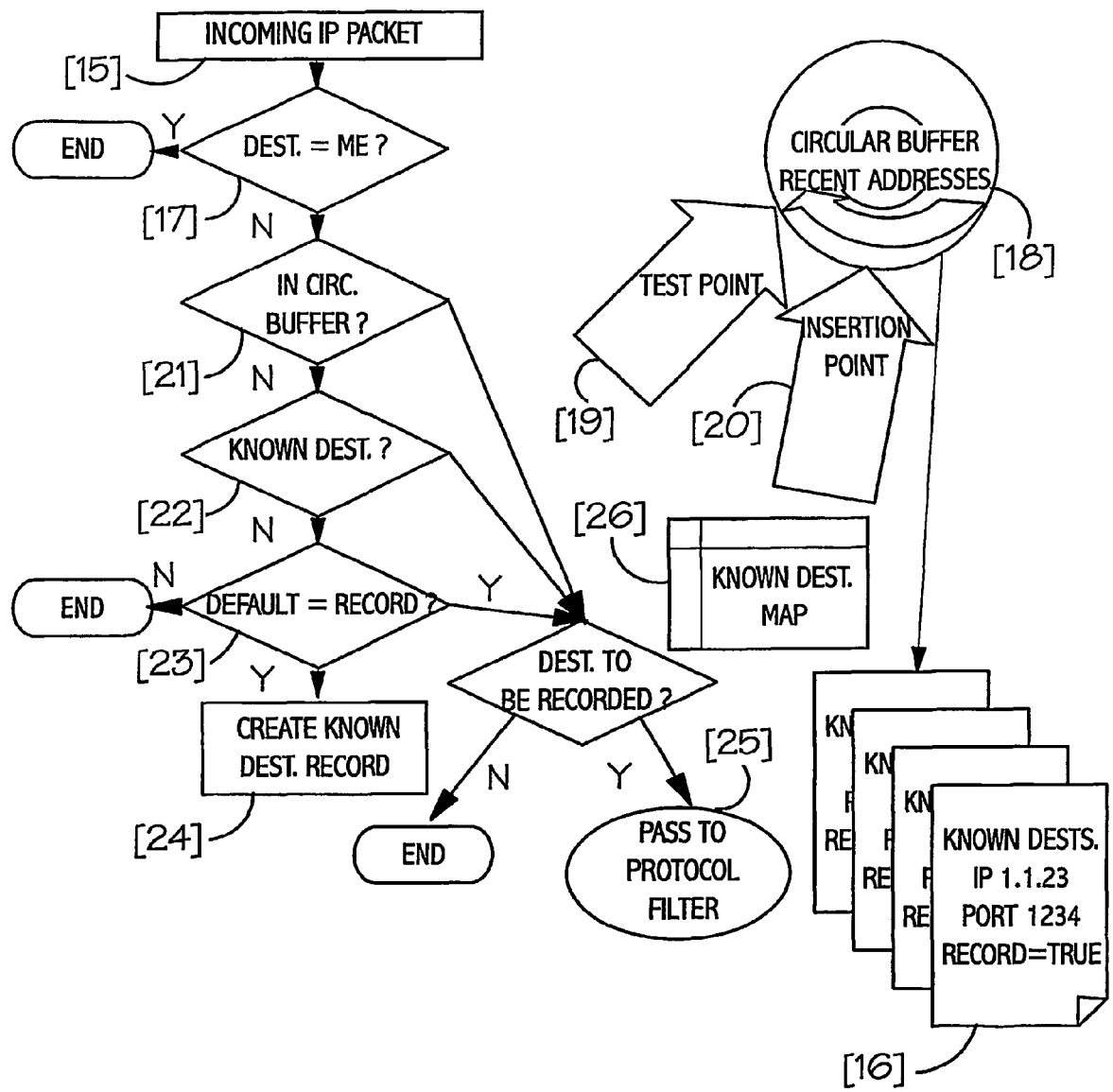
FIG. 2 is a schematic block diagram showing the operation of an IP address filter embodying an aspect of the present invention.

With reference to FIG. 2, once a packet is received and determined to be an IP packet it is examined by the IP Address Filter to determine whether or not it is to be recorded. It should be appreciated that, according to the network traffic patterns experienced and the proportion to be recorded, the order and/or presence of each of these filtering stages may be changed to deliver optimum performance typically measured by the packet rate that can be processed within a given proportion of the CPU time available.

The IP packet [15] is normally first compared [17] with the IP address of the computer on which the recorder is hosted. This allows very rapid elimination of all packets that are intended for other processes on this computer and ensures that the hosting of, for example, a search and replay application on the same computer does not adversely impact the performance of the recording sub-system.

The packets which were addressed to other IP addresses are then passed to a circular buffer lookup algorithm [21]. Recently received IP destination addresses including IP port number, are noted in a circular buffer [18]. When a packet is received, its IP address is compared with that of the entry at a Test Point [19] in the circular buffer [18]. If a match is identified, the Test Point [19] is advanced and the entry in the circular buffer is used as a pointer to the Known Destination Object [16] for this IP address. An entry in the Known Destination object's [16] data structure indicates whether or not the packet is to be recorded [25]. If it is, then it is passed through to the Protocol Filter (next section).

If the packet's IP address does not match the next item in the Circular Buffer [18], it is compared against one or more subsequent entries and if a match is found, the test point [19] is advanced to this point. The entries that were tested and found not to match will be removed from the buffer as it can be deduced that they are no longer in the correct position or the stream to those addresses has terminated.

If the packet's IP address does not match any of those within the lookahead window described above, it is passed to the following stage of the filter [22] in which the IP address is used to determine if there is an existing Known Destination record [16] for this IP address.

The Known Destination list is typically held in memory in the form of a map with a fast indexing or hash function that allows rapid searching of many such records for the one with a specific address. However, the nature of IP addresses (e.g. 10.25.34.245) is deliberately hierarchical with the earlier numbers (when represented in text string form as here) representing the larger sub-networks. It is therefore very common for the vast majority of traffic observed on a single network segment to involve IP addresses from that sub-net i.e. the first 2 or even 3 of the numbers will be common. In such cases it is viable to maintain one or more look-up tables of Known Destination Maps [26] which simulate content addressable memory For example, such a table, with 65,536 entries can hold pointers to all the Known Destination records [16] relating to the block of IP addresses 10.10.xxx.yyy where xxx and yyy are any number from 0 to 255.

It is therefore very easy and quick to compare the top (leftmost when written as text) two bytes of an IP address against the base address of such a lookup table and, if they match, use the lower (rightmost when written as text) bytes as an index into the table. A 0 (null) entry in the table infers that the destination does not yet have a Known Destination record associated with it whilst a non-zero entry can contain a pointer to the relevant Known Destination object.

If the Destination is not within the range of any such rapid lookup maps [26], the normal hash table or other indexing method will be used to determine if a Known Destination Record exists. If it does, it will be inserted into the Circular Buffer [18] at the insertion point normally immediately prior to the test point [19].

If an existing Known Destination record is not found, then a new record will be created and the Record flag will be set to true or false according to the default recording rules [23].

Having found, or created, the appropriate Known Destination Record [16], the packet will at [25] either be discarded or passed to the Protocol Filter according to the Record flag within the Known Destination Record. It should be noted that the Known Destination Records can also be created, deleted and their recording flag set/reset by the Unify interface [12].

Also in order, to avoid long term build-up of redundant Known Destination Records [16], a background process can serve to periodically review the last time that a packet was observed being sent to that destination and will destroy the Known Destination Record should this exceed a pre-determined threshold. To enable this function, a data field within the Known Destination Record structure is updated to reflect the current system time whenever it is used to determine whether or not to record a packet.

Figure 3:
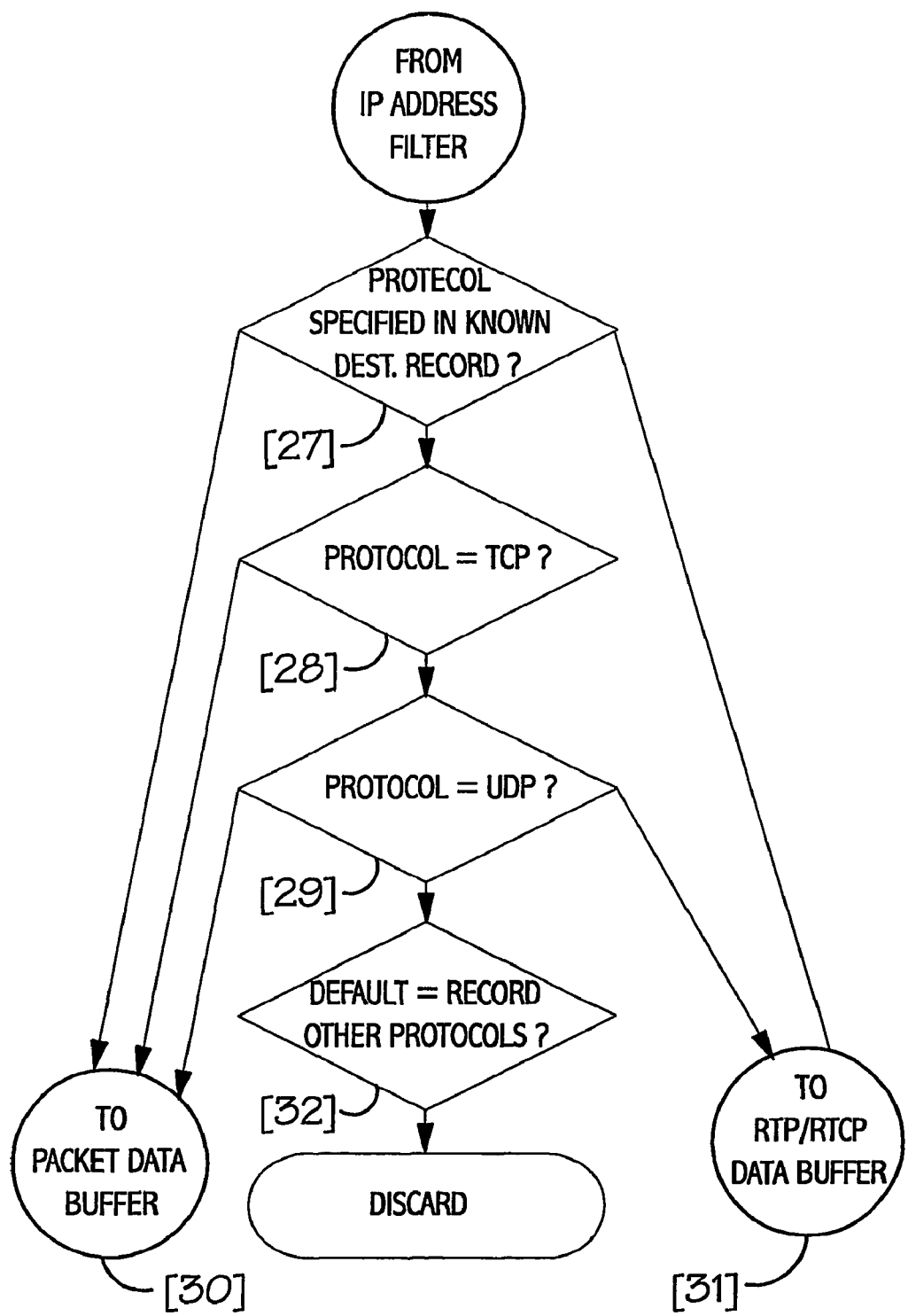
FIG. 3 is a schematic block diagram showing the operation of a protocol filter embodying an aspect of the present invention.

As illustrated in FIG. 3, the Protocol filter stage can be embodied very simply. It first examines the contents of the Known Destination Record [16] that is by now associated with the packet being processed. This record may contain information that allows the protocol filter to determine which protocol the packet should contain. This is particularly advantageous in the case of RTP data streams as there is no guaranteed method for determining that a packet is indeed an RTP packet. Such packets are identified as UDP protocol but there is no indication within the UDP packet that the payload is indeed RTP. Unless an external influence such as Unify [12] has deduced that RTP is to be expected on a given destination IP address, the only alternative is to determine if the first few bytes of the UDP packet's payload represent valid entries for an RTP packet header. This is time consuming and prone to occasional false detection. Hence, if the protocol being sent to a specific port is known already, this can be used to direct the packet at either the Packet Data Buffer [30] or the RTP/RTCP Buffer [31].

If the Known Destination Record [16] does not specify the protocol expected, the filter next examines the protocol type specified within the IP packet. A typical filter will simply check for TCP [28] and pass these packets to the Packet Data Buffer [30] then check for UDP packets [29] and pass these to the RTP/RTCP Packet Buffer [31]. According to pre-configured default behaviour [32], other protocol types may be either discarded [33] or sent to one or other of the two described buffering modules or to a new buffering module specifically optimized for storage of that protocol type such as ARP, ICMP or SNMP.

Figure 4:
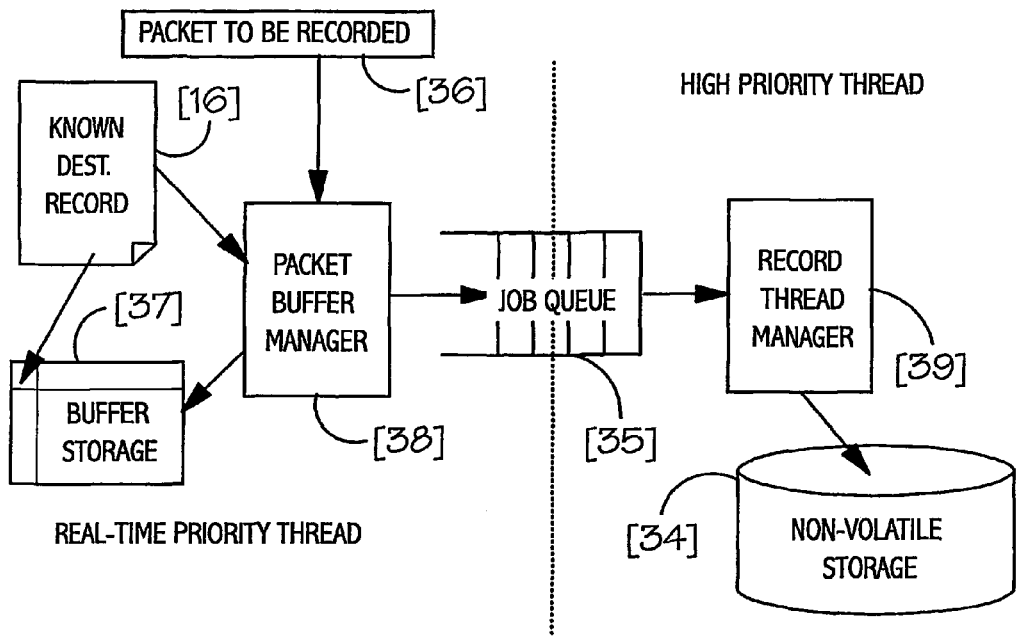
FIG. 4 is an illustration of packet data buffering as arising in an embodiment of the present invention.

Turning now to FIG. 4 there is illustrated the packet data buffering of the present invention.

This can prove to be relatively straightforward with each packet simply being preceded by any or all of:

A well-known synchronization value which will ensure eventual re-synchronization of a partially corrupt file;
A precise time stamp;
Offset of local time from Universal Co-ordinated Time (UTC);
Daylight Savings Time offset; or
Length of packet that follows.

If this is the first packet being recorded for a given Known Destination [16] then the Known Destination record will not yet have had a buffer storage element [37] assigned. A start recording job is posted onto the queue [35] for the Record Thread Manager and a buffer [37] is assigned. These buffers are typically several Kbytes in length and can hence hold many individual packets. The packet to be stored and its associated data as listed above is appended to the buffer.

When subsequent packets are received, these are appended to the buffer [37]. At the point where the buffer fills, it is moved to the FIFO queue [35] to await processing by the Record Thread Manager [39]. When the job reaches the head of the queue, it will be appended to the appropriate file on disk [34]. Meanwhile, a new buffer [37] will be allocated to the Known Destination Record [16] and any remnants of the packet which filled the previous buffer are appended to it. This process repeats until the recording is terminated at which point the partially filled buffer [37], if any, is appended to the job queue [35] and a Stop Recording job is then added to the job queue. When the Record Thread Manager reaches a Stop Recording job, it closes the file in question.

Additional details about the call may be included within the Start and Stop Recording messages and these, along with other derived information, such as the total data volume stored are ultimately written to a call detail file, for example in .XML format or direct to a database.

It should be appreciated that a lower priority thread high priority still being lower than Real-time priority—is used for writing data to disk than for capturing, filtering and buffering packets into memory. This allows RAM buffering to absorb short term peak load conditions which would otherwise cause bottlenecks and limit the peak throughput capacity of the recorder.

Figure 5:
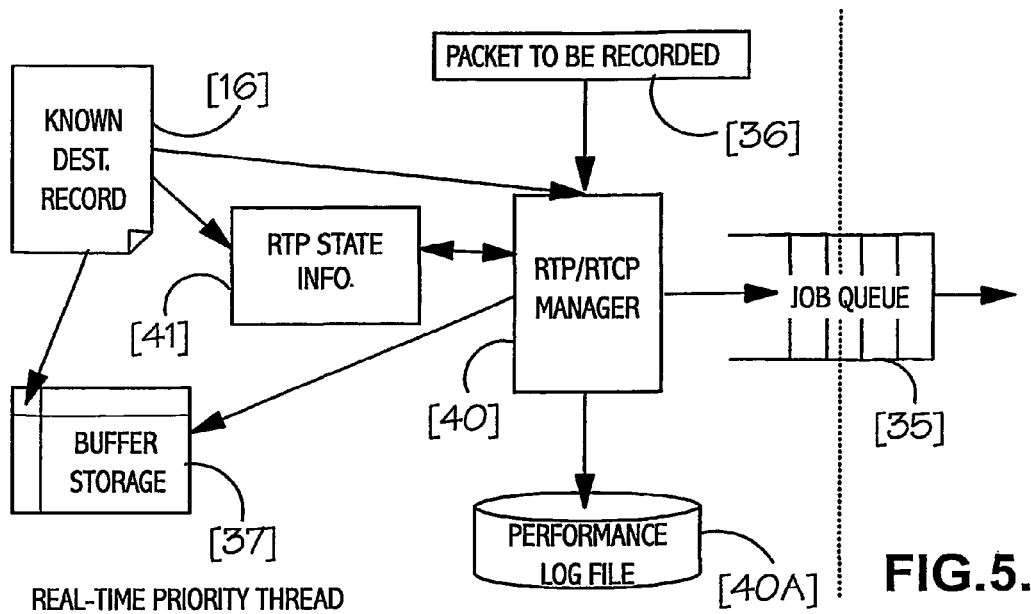
FIG. 5 is an illustration of RTP/PTCP Packet Buffering as arising in an embodiment of the present invention.

FIG. 5 illustrates the RTP/RTCP Packet Buffering.

This component can operate in the same way as the Packet Data Buffering component described above except for the way in which it handles the content of the data packet itself. Since RTP packets typically form a continuous stream of data, there is no need to store the RTP packet header information for all packets as it is only the payload of actual audio/video data that is required. When audio is compressed for transmission, the payload can be as little as 20 bytes (G.729A, 20 ms per packet) yet the total packet length, including Ethernet, IP, UDP and RTP headers, will typically exceed 100 bytes. Hence storing the whole packet is incredibly inefficient.

In the simplest case, the payload of each RTP packet is appended to the buffer [37] and, when full, this is placed on the Record Job Queue [35]. Recording start and stop are exactly as per the Packet Data Buffering component and these two components share a common queue ensuring that data is written to disk in a FIFO manner regardless of which type of recording i.e. packet or stream, is being made.

In the case of the RTP data, the files that are written by the Record Thread Manager are typically in Microsoft .WAV format and hence readable by any player device that supports this file format and the compression standard used within the file.

The process is complicated somewhat by the need to allow for packet loss. This is achieved by maintaining in memory, details of the most recently received packet sequence number and timestamp. It is then possible to compare the currently available packet's sequence number and timestamp with that of the previous packet. A gap in sequence numbers can be noted and logged to a performance log file or similar [40A]. To avoid gradual buildup of error in the recorded file, any lost packet(s) can be compensated for by the automatic appending of the appropriate number of bytes of silence (or other predefined padding sound). Where a small number of bytes are missing (e.g. 1 or 2 packets) it is more efficient to simply add these to the buffer [37] as if they had been received. However, in the case of large gaps, it is more efficient to place the current buffer [37] on the Record Job Queue [35] for processing and then place a Padding job specifying the number of bytes of silence to be inserted. The Record Thread Manager can then append the appropriate number of bytes to the file without using excessive memory space on the Record Job Queue as would be the case if several buffers all full of silence were queued.

This latter technique is particularly advantageous in systems that utilize silence suppression. In such cases, the RTP stream will stop until the audio level reaches a threshold. This can save significant bandwidth in voice communications as typically only one party is speaking at a time. In such cases, the packet sequence numbers in the RTP packet are contiguous but the timestamps are far apart. Again, this can be detected and the appropriate amount of silence indicated through the placement of a Padding job on the record job queue [35]. This then allows the Record Thread Manager to either pad the call with the appropriate amount of silence or to utilize a scheme such as the Wave List feature within the Microsoft .WAV format. This allows for the efficient storage of such audio as a sequence of sound, silence, sound, silence etc.

A further refinement includes the processing of RTCP packets associated with the RTP streams being recorded. By examining the contents of these packets, one can determine the fraction and cumulative number of packets lost by each of the participants in the conversation. These details can be included with the loss rates experienced at the recorder and included in the Stop Recording job and/or entries to the log file [40A]. This allows subsequent analysis of the recorder's performance in comparison to that experienced by the participants on the call.

To assist with the above description, reference is now made to the general structures of the packets arising in the aspects of the present invention.

Figure 6A:
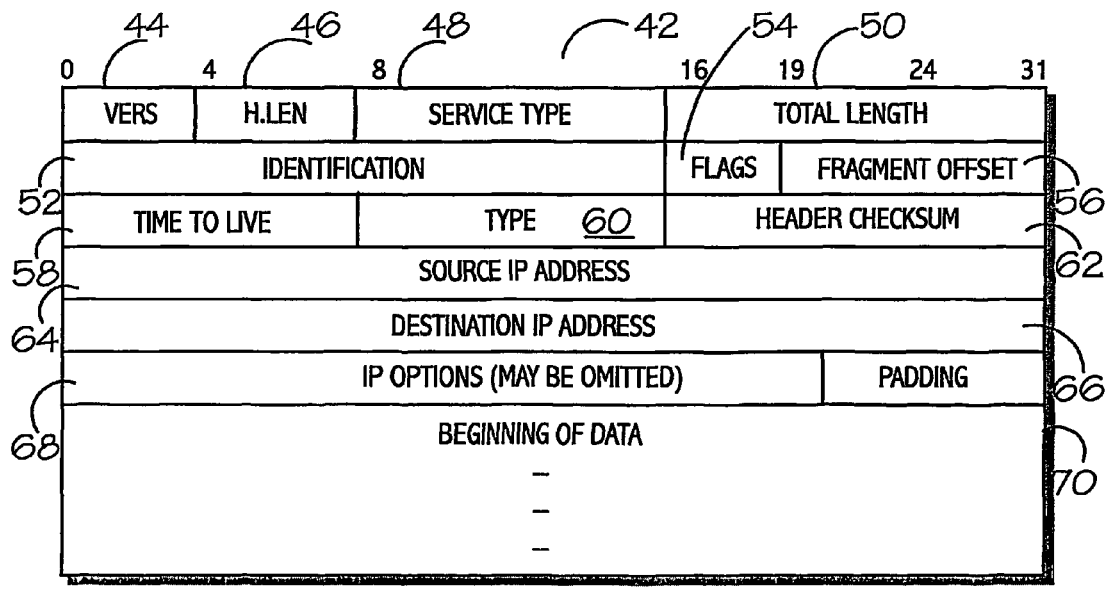
FIGS. 6A-6C illustrate the structure of IP packets, RTP packets and RTCP packets as arising within the present invention.

Turning now to FIG. 6A, a header 42 is shown as a plurality of boxes, each of which represents a portion or "field" of the header. The number of bytes occupied by each portion is also shown, it being understood that each layer consists of 32 bits. The first portion of the header, a "VERS" portion 44, is the protocol version number. Next, an "H.LEN" portion 46 indicates the number of 32-bit quantities in the header. A "SERVICE TYPE" portion 48 indicates whether the sender prefers the datagram to travel over a route with minimal delay or a route with maximal through-put. A "TOTAL LENGTH" portion 50 indicates the total number of octets in both the header and the data.

In the next layer, an "IDENTIFICATION portion 52 identifies the packet itself. A "FLAGS" portion 54 indicates whether the datagram is a fragment or a complete datagram. A "FRAGMENT OFFSET" portion 56 specifies the location of this fragment in the original datagram, if the datagram is fragmented. In the next layer, a "TIME TO LIVE" portion 58 contains a positive integer between 1 and 255, which is progressively decremented at each route travelled. When the value becomes 0, the packet will no longer be passed and is returned to the sender. A "TYPE" portion 60 indicates the type of data being passed. A "HEADER CHECKSUM" portion 62 enables the integrity of the packet to be checked by comparing the actual checksum to the value recorded in portion 62.

The next layer of header 42 contains the source IP address 64, after which the following layer contains the destination IP address 66. An optional IP OPTIONS portion 68 is present, after which there is padding (if necessary) and a data portion 70 of the packet containing the data begins.

Figure 6B:
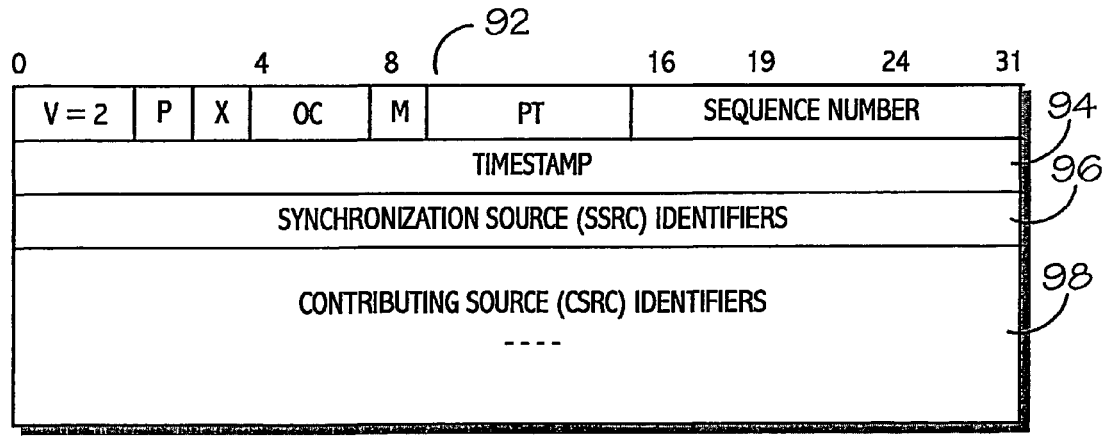

As shown in FIG. 6B, an RTP packet header 92 features several important fields: a timestamp field 94, a synchronization source (SSRC) identifiers field 96 and a contributing source (CSRC) identifiers field 98. SSRC field 96 is used to determine the source of the RTP packets (the sender), which has a unique identifying address (the SSRC identifier). The CSRC identifer in CSRC field 98 is used in a conference with multiple parties, and indicates the SSRC identifier of all parties. Timestamp field 94 is used by an RTP software module to determine the relative time at which the data in each packet should be displayed.

Figure 6C:
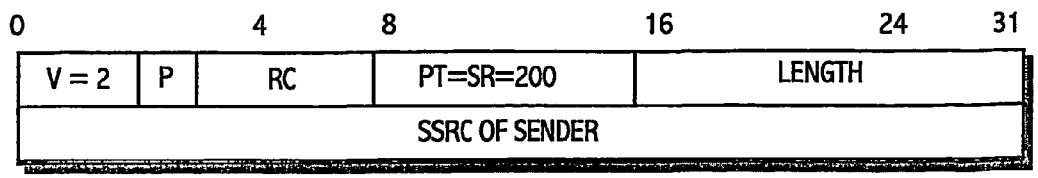

Finally FIG. 6C shows the general structure of an RTCP packet.

The invention claimed is:

1. A method for recording packet data passing through network access points, comprising:
  receiving packet data at plural network interfaces that provide a connection to more than one network access point;
  passing the packet data to an IP address filter comparing an IP address and port number of a packet under examination against a list of known destinations determined in accordance with a set of business rules and observed external activity;
  comparing the IP address to an entry in a circular buffer to determine a match and, if there is the match, using the IP address as a pointer to an entry in a known destination object to determine if the packet under examination is to be recorded;

passing the packet under examination to a protocol filter to determine a protocol of the packet under examination;

passing the packet under examination to a buffer in accordance with the protocol; and storing payload data contained within the packet under examination in a storage device.

2. The method of claim 1, wherein determining the protocol further comprises determining if the protocol is real-time transport protocol (RTP), real-time transport control protocol (RTCP) or other protocol.

3. The method of claim 2 further comprising:

passing real-time transport protocol (RTP) data and real-time transport control protocol (RTCP) data to an RTP/RTCP data buffer; and passing other protocol data to a packet data buffer.

4. The method of claim 3, further comprising:

applying a synchronization to the RTP and RTCP data; and writing the RTP and RTCP data in contiguous blocks to the storage device.

5. The method of claim 3, further comprising:

writing a WAV audio file for RTP data, and writing an XML file for other protocol data.

6. The method of claim 1, further comprising if a match is not found, passing the packet under examination to the protocol filter.

7. A method for recording packetized information packet data passing through network access points, comprising:

comparing an IP address of a received packet with an IP address of a destination recorder device having plural network interfaces;

comparing the IP address of the received packet with an IP destination address and an IP port number contained in a list, if the received packet is destined for a device other than the recorder device, the list being determined in accordance with a set of business rules and observed external activity;

comparing the IP address of the received packet to an entry in a circular buffer to determine a match and, if there is the match, using the IP address of the received packet as a pointer for a known destination object; and recording the received packet based on information contained in the known destination object.

8. The method of claim 7, wherein an entry in the known destination object's data structure indicates whether the received packet is to be recorded.

9. The method of claim 7, wherein the list is held in a buffer as a map with an indexing function.

10. The method of claim 9, wherein if the if the IP address of the received packet is not in the list, a hash table is used to determine the pointer for the known destination object.

11. The method of claim 7, wherein the known destination object includes information that allows the protocol filter to determine which protocol the received packet contains.

12. The method of claim 7, further comprising passing the received packet to a protocol filter.

13. The method of claim 12, further comprising determining if the received packet contains payload representing an RTP packet header.

14. The method of claim 13, further comprising passing the RTP packets to a RTP/RTCP packet buffer.

15. The method of claim 14, further comprising sequencing the RTP packets.

* * * * *